United States Patent [19]
Widmer

[11] Patent Number: 4,744,520
[45] Date of Patent: May 17, 1988

[54] PNEUMATIC SPREADER AND DISTRIBUTOR NOZZLES THEREFOR

[76] Inventor: Gerald L. Widmer, 1 Sunrise Ter., Bayles Lake, Loda, Ill. 60948

[21] Appl. No.: 876,691

[22] Filed: Jun. 20, 1986

[51] Int. Cl.⁴ .............................................. A01C 15/04
[52] U.S. Cl. .................................. 239/654; 239/500; 239/521; 239/524
[58] Field of Search ............... 239/654, 655, 500, 502, 239/518, 521, 523, 524, 592, 593, 597, 599, 601

[56] References Cited

U.S. PATENT DOCUMENTS

| | | | |
|---|---|---|---|
| 923,023 | 5/1909 | Cranwell et al. ................... | 239/500 |
| 2,476,465 | 7/1949 | Tarrant ............................... | 239/654 |
| 2,720,721 | 10/1955 | Reynolds, Jr. et al. ............. | 239/654 |
| 3,330,445 | 7/1967 | Love, Jr. ............................. | 239/654 |

FOREIGN PATENT DOCUMENTS

| | | | |
|---|---|---|---|
| 2752590 | 5/1979 | Fed. Rep. of Germany ...... | 239/655 |
| 1170579 | 1/1959 | France ................................. | 239/655 |
| 28060 | of 1912 | United Kingdom ................ | 239/654 |

Primary Examiner—Andres Kashnikow
Assistant Examiner—Michael J. Forman
Attorney, Agent, or Firm—Lockwood, Alex, FitzGibbon & Cumming

[57] ABSTRACT

A pneumatic spreader and distributor nozzles for the distribution of solid materials is disclosed. The nozzles include a flow chamber having an inlet opening, an outlet opening, and a discharge structure positioned adjacent to the outlet opening. Both the flow chamber and the discharge structure are shaped and dimensioned so as to discharge the materials in a uniform pattern.

28 Claims, 2 Drawing Sheets

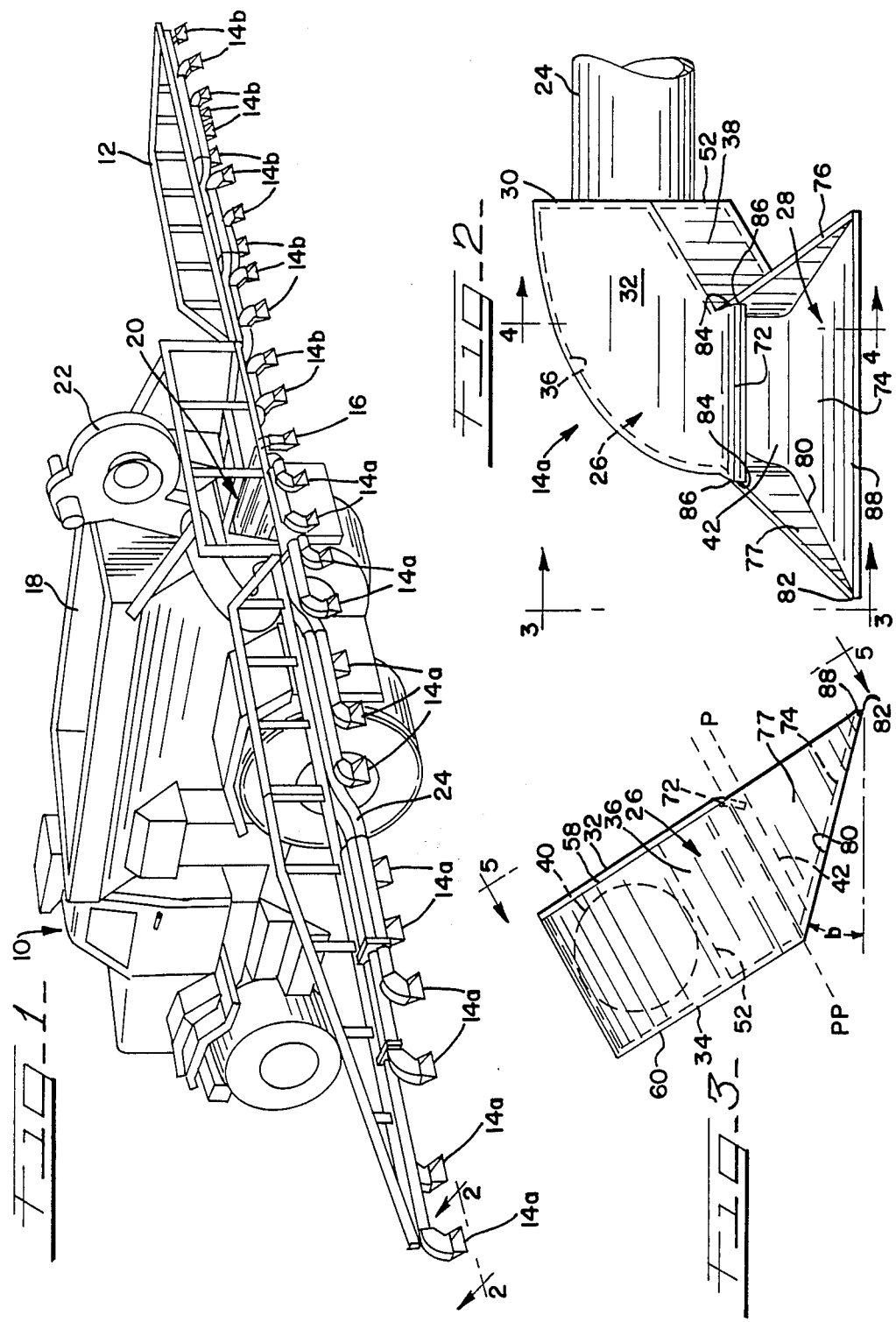

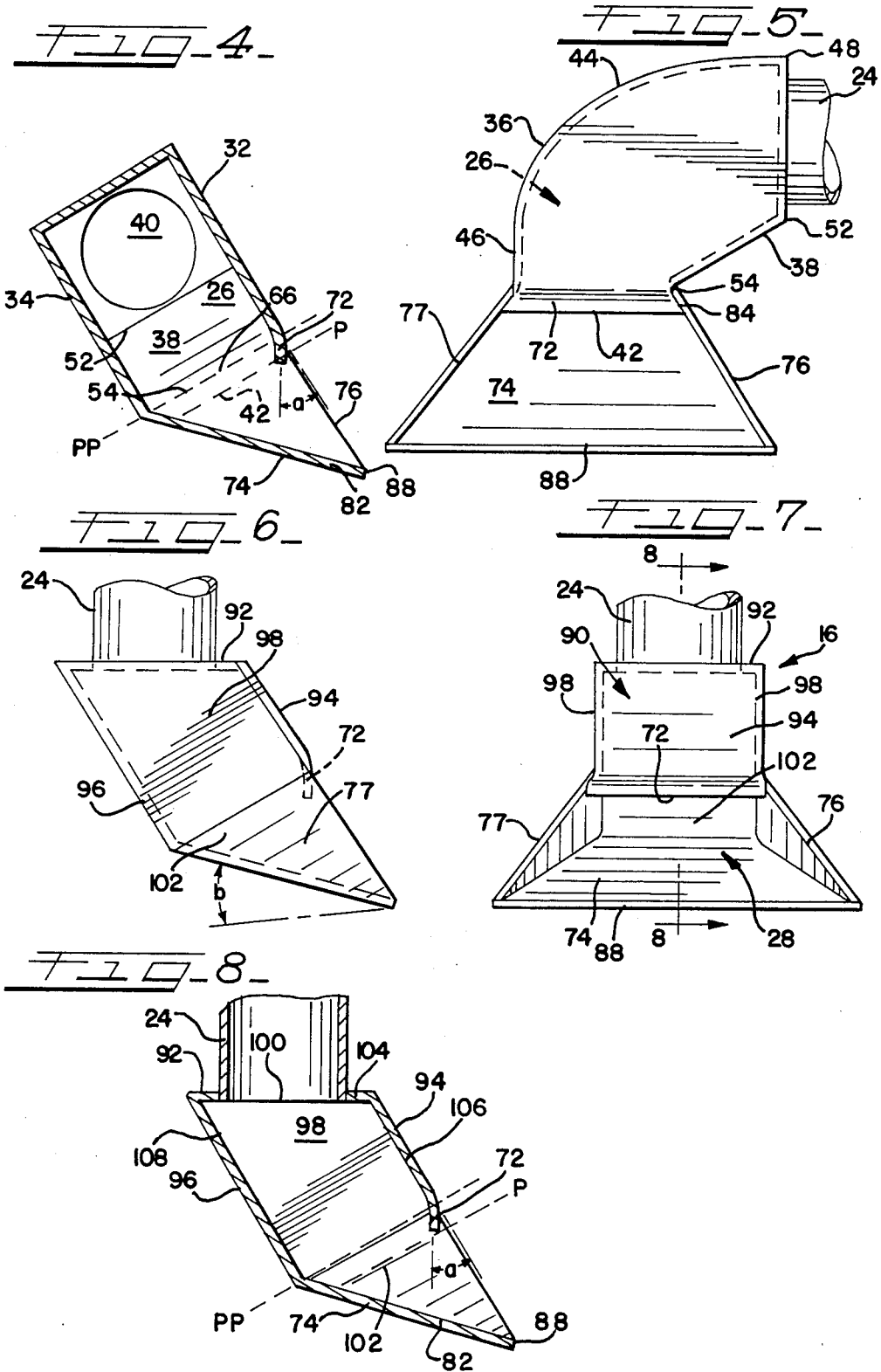

PNEUMATIC SPREADER AND DISTRIBUTOR NOZZLES THEREFOR

BACKGROUND AND SUMMARY OF INVENTION

The present invention relates to a pneumatic spreader and improved distributor nozzles for solids distribution and, more particularly, to a spreader and distributor nozzles for uniform distribution and application of solid materials, such as fertilizers and the like.

Various types of materials applicators for distributing solid materials, such as fertilizers, herbicides, insecticides and the like, have been utilized in the past. These prior solids applicators generally have one or more hoppers that contain the materials to be distributed and the materials are dispensed from the hopper via an arrangement of metering mechanisms and conduits. In some of the prior applicators the materials are propelled through the conduits by air and distributed to the ground. One such applicator of this type is shown by way of example in my U.S. Pat. No. 4,562,968 in which the solids are disclosed as injected directly into the ground by way of a tool bar mechanism. In the alternative in the conduit system shown in my aforementioned patent the solids may also be distributed by broadcast where the solids are discharged above the ground through transversely spaced distributor nozzles.

A typical solids broadcast distributor nozzle in the past consisted of a simple flat deflector plate which was mounted beneath and spaced from the outlet of the solids conduit at a preselected angle to the discharge flow of the materials. The solids struck the deflector plate upon discharge from the outlet and spread in a random fashion, often resulting in a poor spread patternization. In other words, some areas across the path of travel of the nozzle would receive too much of the materials and other areas too little.

Pneumatic solids distributor nozzles of the present invention overcome the aforementioned shortcoming. In pneumatic solids distributor nozzles incorporating the principles of the present invention, a highly uniform distribution of materials over the entire width of each nozzle's coverage width is realized.

In one principal aspect of the present invention, a distributor nozzle for distributing materials suspended in a stream of fluid comprises a flow chamber, an inlet opening into the chamber for introducing the materials suspended in the fluid to the chamber, and a discharge opening from the chamber for discharging the materials suspended in the fluid from the chamber. The discharge opening is spaced from the inlet opening and has a cross-sectional area greater than the cross-sectional area of the inlet opening. A discharge structure means is positioned adjacent to but downstream of the discharge opening. The discharge structure means comprises a deflector plate of increasing width and extending at an angle relative to and into the flow from the discharge opening, and a pair of spaced flared sidewalls on the deflector plate which extend at an angle to each other and away from the discharge opening. The angle of the sidewalls is greater than the angle of spread of the materials issuing from the discharge opening.

In still another principal aspect of the present invention, a pneumatic spreader for broadcasting solids suspended in a gas stream comprises suspension means for suspending the solids in the gas stream, conduit means for conveying the suspended solids to a plurality of transversely spaced locations, and a plurality of distributor nozzles at each of the locations and affixed to the conduit means for broadcasting the solids conveyed by the conduit means. The distributor nozzles comprise a flow chamber, an inlet opening into the chamber for introducing the materials suspended in the fluid to the chamber, and a discharge opening from the chamber for discharging the materials suspended in the fluid from the chamber. The discharge opening is spaced from the inlet opening and has a cross-sectional area greater than the cross-sectional area of the inlet opening. A discharge structure means is positioned adjacent to but downstream of the discharge opening. The discharge structure means comprises a deflector plate of increasing width and extending at an angle relative to and into the flow from the discharge opening, and a pair of spaced flared sidewalls on the deflector plate which extend at an angle to each other and away from the discharge opening. The angle of the sidewalls is greater than the angle of spread of the materials issuing from the discharge opening.

In still another principal aspect of the present invention, the aforementioned nozzles include deflector means spaced from the deflector plate adjacent the discharge opening to deflect materials toward the deflector plate as they issue from the discharge opening.

In still another principal aspect of the present invention, the discharge opening of the last mentioned nozzles is defined at least in part by a downstream edge of the deflector means.

In still another principal aspect of the present invention, the discharge opening of the last mentioned nozzles is also defined by the deflector plate and the flared sidewalls.

In still another principal aspect of the present invention, the flared sidewalls of the aforementioned nozzles extend from the discharge opening at different angles to each other.

In still another principal aspect of the present invention, the inlet opening and discharge opening of at least some of the aforementioned nozzles respectively enter and leave the flow chamber in angular relationship to each other. The flow chamber includes a chamber sidewall for deflecting the flow of materials and fluid from the inlet opening to the discharge opening. The chamber sidewall comprises a major portion of which is curved, and a minor portion of which is substantially straight adjacent the discharge opening.

In still another principal aspect of the present invention, the discharge opening of the aforementioned nozzles is rectangular.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a rear perspective view of a materials applicator of the type having a hopper assembly and a pneumatic spreader having distributor nozzles incorporating the principles of the present invention;

FIG. 2 is an enlarged front elevation view of one of the distributor nozzles as viewed substantially along line 2—2 of FIG. 1;

FIG. 3 is a side elevation view of the distributor nozzle as viewed substantially along line 3—3 of FIG. 2;

FIG. 4 is a cross-sectioned, side elevation view of the distributor nozzle, as viewed substantially along line 4—4 of FIG. 2;

FIG. 5 is a plan view of the distributor nozzle, as viewed substantially along line 5—5 of FIG. 3;

FIG. 6 is a side elevation view of another embodiment of the distributor nozzle incorporating the principles of the present invention;

FIG. 7 is a front elevation view of the embodiment of the distributor nozzle shown in FIG. 6; and FIG. 8 is a cross-sectioned, side elevation view of the distributor nozzle, as viewed substantially along line 8—8 of FIG. 7.

DESCRIPTION OF THE PREFERRED EMBODIMENTS

An overall perspective view of a solid materials applicator including a vehicle 10 is shown in FIG. 1. The applicator includes an elongate boom 12 mounted on the vehicle with a network of transversely spaced distributor nozzles 14a, 14b and 16 incorporating the principles of the present invention. The vehicle 10 includes a hopper 18 for containing and transporting the solid materials which are to be spread by the applicator 20 and the nozzles 14a, 14b and 16. The hopper 18 as shown in the drawings is one which contains solid particulate materials such as, for example, fertilizer which is to be applied to the soil.

The solid particulates in hopper 18 are discharged from the rear of the hopper and may be transported to the network of nozzles 14a, 14b and 16 of the present invention by a pneumatic distribution system, such as, for example, is disclosed in my U.S. Pat. No. 4,562,968, the details of which are hereby incorporated by reference. In such a system the solid particulates are discharged from the rear of hopper 18 and forced by air from the blower 22 through a series of conduits 24 for each of the distributor nozzles 14a, 14b and 16 whereby they are evenly distributed to each of the nozzles. Upon reaching the nozzles the solids are then discharged through the distributor nozzles 14a, 14b and 16 of the present invention. It will be understood that the pneumatic system as described is by way of example only and that the use of the distributor nozzles of the present invention is not limited to the pneumatic system described.

FIG. 1 shows twenty-seven distributor nozzles 14a, 14b and 16 constructed in accordance with the present invention which are connected by welding or other suitable means to the discharge openings of the conduits 24. The nozzles 14a, 14b and 16 are mounted at relatively equal transversely spaced locations along the length of boom 12. The thirteen nozzles 14a to the left of center nozzle 16 are substantially identical to the thirteen nozzles 14b to the right of center nozzle 16, except that the left-hand nozzles 14a are the mirror-image of the right-hand nozzles 14b. Consequently, depending upon which side of the nozzle the inlet opening 40 is located, see FIG. 2, the flow chamber 26 of the nozzle curves accordingly in order to force the particulate matter rearward. The twenty-six nozzles 14a and 14b are described below as the preferred embodiment and the center nozzle 16 is described as a second embodiment.

The preferred embodiment of distributor nozzle 14a incorporating the principles of the present invention is shown in FIGS. 2-5. Nozzle 14a includes a flow chamber 26 and a discharge structure 28 positioned adjacent the discharge from chamber 26. The flow chamber 26 is defined by an inlet wall 30, an upper wall 32, a lower wall 34, a curved flow deflecting outer sidewall 36 and an inner sidewall 38. An inlet opening 40 in the inlet wall 30 communicates with the discharge opening (not shown) from one of the conduits 24 and a generally rectangular outlet opening 42 by way of the flow chamber 24. The inlet wall 30 with its inlet opening 40 are preferably substantially perpendicular to the plane of the outlet opening 42.

The curved flow deflecting sidewall 36 is generally curvilinear over a major portion 44 of its length as shown in FIG. 5, negotiating a substantially 90° curve between edge 48 of inlet wall 30 and a location near, but short of the outlet opening 42. At the latter location, the curved wall 36 terminates in a substantially straight wall portion 46 adjacent the outlet opening, also as shown in FIG. 5. Both wall portions 44 and 46 are positioned generally in the flow path of the materials passing through the chamber 26 from the inlet opening 40. The inner sidewall 38 is substantially straight and extends from the opposite edge 52 of inlet wall 30 to adjacent the side 54 of outlet opening 42 which is nearest the inlet opening 40.

Upper wall 32 and lower wall 34 are substantially identical to each other except as to be noted to follow. They are fixed to inlet wall 30, curved flow deflecting sidewall 36, and inner sidewall 38 by welding or other suitable means in order to enclose the flow chamber 26. As shown in FIG. 3, the downstream edge of flow deflecting sidewall 36 and its straight portion 46 are preferably approximately perpendicular to the upper and lower edges 58 and 60 of sidewall 36, which edges are in contact with the upper wall 32 and lower wall 34. The downstream edge 66 of inner sidewall 38 is also oriented in the same manner with respect to the upper and lower walls 32 and 34, as shown in FIG. 4.

The discharge structure 28 comprises an upper deflector tab 72, a lower deflector plate 74, and a pair of outwardly flared sidewalls 76 and 77. The upper deflector tab 72 is positioned adjacent the outlet opening 42 and extends at an angle a, preferably about 15°, from the plane of the upper wall as shown in FIG. 4. The deflector tab 72 is preferably formed by bending an elongated portion of the upper wall 32 downwardly, as shown in FIG. 4, toward the lower deflector plate 74.

The lower deflector plate 74 is also positioned adjacent the outlet opening 42 and preferably extends upwardly at about a 45° angle from the lower wall 34. The lower deflector plate 74 is also preferably formed by bending an extended portion of lower wall 34 upward, as shown in FIG. 4. Also as shown in FIG. 4, the lower deflector plate 74 is substantially longer than upper deflector tab 72. The upper deflector tab 72 and lower deflector plate 74 are angled towards each other and the rectangular outlet opening 42 is defined by a plane p, as shown in FIGS. 3 and 4, which passes through the downstream edge of the upper deflector tab 72. The relationship between the areas of this outlet opening 42 and the inlet opening 40 are an important feature of the present invention and will be described later.

It will be seen when viewing FIG. 2, that sidewalls 76 and 77 of the discharge structure 28 are generally triangular in shape and preferably extend outward from the inner sidewall 38 and curved flow deflecting sidewall 36, respectively. Sidewalls 76 and 77 can be formed either by bending a portion of inner sidewall 38 and curved flow deflecting sidewall 36 outward, by welding the sidewalls to inner sidewall 38 and curved flow deflecting sidewall 36 adjacent outlet opening 42, or by other suitable means. The lower edge 80 of each sidewall 76 and 77 is fixed to the outer edge 82 of lower deflector plate 74, such as by welding. The outer end edges 84 of upper deflector tab 72 are also preferably welded to the top corner 86 of each sidewall 76 and 77, as shown in FIG. 3, to define an enclosed structure.

Lower deflector plate 74 is generally trapezoidally shaped with its width continuously increasing away from outlet opening 42. The lower deflector plate 74 has a width approximately equal to that of the outlet opening 42 at that opening. Moving from outlet opening 42 to the end 88 of lower deflector plate 74, the width of lower deflector plate 74 continuously increases so that it is the widest at its end 88. It is preferred that the width increase at a rate such that sidewalls 76 and 77 of the discharge structure 28 which are attached thereto spread at an angle greater than the width of the spread pattern of the solid particulate matter as suspended in air which issues from the nozzle. Additionally, it is preferred that the sidewall 77, which is furthest from inlet opening 40, be angled outward slightly more than sidewall 76.

When installed on the boom 12, each nozzle **14*a* and 14*b* is preferably oriented such that inlet wall 30 and its inlet opening 40 are substantially vertical. Additionally, each nozzle 14*a* and 14*b* is preferably oriented such that the lower deflector plate 74 is at an angle b to the ground, as shown in FIG. 3**, of approximately 15°.

It has been found that certain relationships of elements of the distributor nozzles incorporating the principles of the present invention are important in achieving the substantially improved performance and uniform patternization of the nozzles of the invention.

The flow deflecting outer wall 36 with its curved major portion 44 terminating in the substantially straight wall portion 46 adjacent the outlet opening 42 is important in achieving uniformity of distribution of the solid particulates across the lower deflector plate 74. It has been found that the straight wall portion 46 precludes the presence of greater amounts of the solids on that side of the deflector plate 74 than on the opposite side of the plate. By way of example, it has been found that a length of about one inch for the straight wall portion 46 is satisfactory in achieving a uniform distribution across the width of the deflector plate 74.

Another important feature of the nozzles of the present invention is that the area of the outlet opening 42 should be larger than the area of the inlet opening 40. This also insures even distribution of the materials across the lower deflector plate 74. This is true whether the outlet opening is defined either at plane p or at plane pp, as viewed in FIGS. 3 and 4.

Still another important feature of the present invention is the presence of the upper deflector tab 72 at the discharge opening 42. This tab 72 deflects the flowing materials downwardly against the lower deflector plate 72 to permit full utilization of the deflector plate 74 and shaping of the discharge with a uniform distribution of materials across the cross-section of the discharge opening 42. Although the exact angle a of the upper deflector tab 72 is not critical itself, it should not be so large as to cause particulate solids to be retained. As previously mentioned, an angle a about 15° has been found to be satisfactory.

Yet another important feature of the present invention is the degree of flare of the sidewalls 76 and 77 of the discharge structure 28. The angle at which these sidewalls flare away from each other toward the downstream edge 88 of the discharge structure 28 should be greater than the spread angle of the solid particulates as suspended in air as they issue from the discharge opening 42. This precludes build up of the solids at the sidewalls 76 and 77.

Another embodiment of the distributor nozzle of the present invention is shown as the center nozzle 16 in FIG. 1 and in more detail in FIGS. 6–8. This nozzle is essentially identical to the distributor nozzle **14*a*** thus far described, except that it is not curvilinear and the inlet opening enters from the top rather than the side of the nozzle.

Nozzle 16 includes a discharge structure 28 similar to that shown in FIGS. 2–5 and discussed above. Accordingly, like reference numerals are employed to designate similar elements of the outlet structure 28. The principal difference between the outlet structure of the nozzles **14*a* and 16 is that the sidewalls 76 and 77 in the nozzle 14*a* preferably flares outwardly at different angles, whereas those of nozzle 16 need not. This is due to the symmetric location of the top entering inlet 100 and its conduit 24 in the nozzle 16**.

Nozzle 16 also has a flow chamber 90 defined by an upper inlet wall 92, a top wall 94, a bottom wall 96 and a pair of identical sidewalls 98. An inlet opening 100 enters the upper inlet wall 92 and a generally rectangular outlet opening 102 exits from the flow chamber 90 opposite the inlet opening 100. Upper inlet wall 92 and inlet opening 100 are approximately horizontal when installed on conduit 24 and are located at the top of flow chamber 90. Top wall 94 and bottom wall 96 are fixed to inlet wall 92 at opposite edges of inlet wall 92 and are approximately parallel to each other. As shown in FIG. 8, top wall 94 and bottom wall 96 are positioned at an angle to upper inlet wall 92. Sidewalls 98 are fixed as by welding to the edges 104 of inlet wall 92, edges 106 of the top wall 94 and edges 108 of the bottom wall 96. Outlet opening 102 is again defined by plane p as shown in FIG. 8 which passes through the downstream edge of the upper deflector tab 72. As in the nozzle **14*a*, it is preferred that the cross-sectional area of the outlet opening 102, either as defined by plane p or plane pp as shown in FIG. 8, be greater than the cross-sectional area of the inlet opening 100**.

It will also be appreciated that the flare angle of the sidewalls 76 and 77 of the discharge structure 28 relative to each other and the presence of the upper deflector tab 72 enjoy the same degree of importance in the nozzle 16 embodiment that they do in the previously described nozzle **14*a* embodiment. More specifically, the angle of these sidewalls should be greater than the angle of spread of the solid particulates suspended in air as they issue from the outlet opening 102**.

It will be appreciated that although the nozzles of the present invention have been described in terms of use with solids suspended in air, the principles of the present invention may be utilized with liquids or slurries suspended in air or other fluid media.

It will also be understood that the embodiments of the present invention which have been described herein are merely illustrative of an application of the principles of the invention. Numerous modifications may be made by those skilled in the art without departing from the spirit and scope of the invention.

What I claim is:

1. A distributor nozzle for distributing materials suspended in a stream of fluid, said nozzle comprising:
   a flow chamber;
   an inlet opening into said chamber for introducing the materials suspended in the fluid to said chamber;
   a discharge opening from said chamber for discharging the materials suspended in the fluid from said chamber, said discharge opening being spaced from said inlet opening and having a cross-sectional area greater than the cross-sectional area of said inlet opening; and
   a discharge structure means adjacent to but downstream of said discharge opening, said discharge structure means comprising a deflector plate of increasing width and extending at an angle relative to and into the flow from said discharge opening, and a pair of spaced flared sidewalls on said deflector plate and which extend at an angle to each other and away from said discharge opening, the angle of said sidewalls being greater than the angle of spread of the materials issuing from said discharge opening.

2. The distributor nozzle of claim 1, including deflector means spaced from said deflector plate adjacent said discharge opening to deflect materials toward said deflector plate as they issue from said discharge opening.

3. The distributor nozzle of claim 2, wherein said discharge opening is defined at least in part by a downstream edge of said deflector means.

4. The distributor nozzle of claim 3, wherein said discharge opening is also defined by said deflector plate and said flared sidewalls.

5. The distributor nozzle of claim 4, wherein said inlet opening and discharge opening respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

6. The distributor nozzle of claim 5, wherein said discharge opening of said distributor nozzle is rectangular.

7. The distributor nozzle of claim 3, wherein said inlet opening and discharge opening respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

8. The distributor nozzle of claim 2, wherein said inlet opening and discharge opening respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

9. The distributor nozzle of claim 2, wherein said discharge opening is rectangular.

10. The distributor nozzle of claim 1, wherein said flared sidewalls extend from said discharge opening at different angles.

11. The distributor nozzle of claim 10, wherein said inlet opening and discharge opening respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

12. The distributor nozzle of claim 1, wherein said inlet opening and discharge opening respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

13. The distributor nozzle of claim 12, wherein said discharge opening is rectangular.

14. The distributor nozzle of claim 1, wherein said discharge opening is rectangular.

15. A pneumatic spreader for broadcasting solids suspended in a gas stream comprising:
    suspension means for suspending the solids in the gas stream;
    conduit means for conveying the suspended solids to a plurality of transversely spaced locations; and
    a plurality of distributor nozzles at each of said locations and affixed to said conduit means for broadcasting the solids conveyed by said conduit means;
    said distributor nozzles comprising:
    a flow chamber;
    an inlet opening into said chamber for introducing the materials suspended in the fluid to said chamber;
    a discharge opening from said chamber for discharging the materials suspended in the fluid from said chamber, said discharge opening being spaced from said inlet opening and having a cross-sectional area greater than the cross-sectional area of said inlet opening; and
    a discharge structure means adjacent to but downstream of said discharge opening, said discharge structure means comprising a deflector plate of increasing width and extending at an angle relative to and into the flow from said discharge opening, and a pair of spaced flared sidewalls on said deflector plate and which extend at an angle to each other and away from said discharge opening, the angle of said sidewalls being greater than the angle of spread of the materials issuing from said discharge opening.

16. The pneumatic spreader of claim 15, wherein said distributor nozzles include deflector means spaced from said deflector plate adjacent said discharge opening to deflect materials toward said deflector plate as they issue from said discharge opening.

17. The pneumatic spreader of claim 16, wherein said discharge opening of said distributor nozzles is defined at least in part by a downstream edge of said deflector means.

18. The pneumatic spreader of claim 17, wherein said inlet opening and discharge opening of at least some of said distributor nozzles respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

19. The pneumatic spreader of claim 17, wherein said discharge opening of said distributor nozzles is also defined by said deflector plate and said flared sidewalls.

20. The pneumatic spreader of claim 19, wherein said inlet opening and discharge opening of at least some of said distributor nozzles respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

21. The pneumatic spreader of claim 19, including vehicular means for propelling said pneumatic spreader across the ground.

22. The pneumatic spreader of claim 16, wherein said inlet opening and discharge opening of at least some of said distributor nozzles respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

23. The pneumatic spreader of claim 16, wherein said discharge opening of said distributor nozzles is rectangular.

24. The pneumatic spreader of claim 15, wherein said flared sidewalls of at least some of said distributor nozzles extend from said discharge opening at different angles.

25. The pneumatic spreader of claim 24, wherein said inlet opening and discharge opening of at least some of said distributor nozzles respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

26. The pneumatic spreader of claim 15, wherein said inlet opening and discharge opening of at least some of said distributor nozzles respectively enter and leave said flow chamber in angular relationship to each other, and said flow chamber includes a chamber sidewall for deflecting the flow of materials and fluid from said inlet opening to said discharge opening; said chamber sidewall comprising a major portion of which is curved, and a minor portion of which is substantially straight adjacent said discharge opening.

27. The pneumatic spreader of claim 15, wherein said discharge opening of said distributor nozzles is rectangular.

28. The pneumatic spreader of claim 15, including vehicular means for propelling said pneumatic spreader across the ground.

* * * * *